(12) United States Patent
Golden et al.

(10) Patent No.: US 6,483,001 B2
(45) Date of Patent: Nov. 19, 2002

(54) LAYERED ADSORPTION ZONE FOR HYDROGEN PRODUCTION SWING ADSORPTION

(75) Inventors: Timothy Christopher Golden, Allentown, PA (US); Edward Landis Weist, Jr, Macungie, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 130 days.

(21) Appl. No.: 09/746,998

(22) Filed: Dec. 22, 2000

(65) Prior Publication Data

US 2002/0082463 A1 Jun. 27, 2002

(51) Int. Cl.[7] ............... C10G 11/00; C10G 25/00; C07C 7/12; B01D 59/26
(52) U.S. Cl. ............... 585/820; 208/299; 208/300; 208/307; 208/310 Z; 208/310 R; 208/340; 208/341; 208/103; 95/143
(58) Field of Search ............... 585/820; 208/299, 208/300, 307, 310 Z, 310 R, 340, 341, 103; 95/143

(56) References Cited

U.S. PATENT DOCUMENTS

| | | | |
|---|---|---|---|
| 3,430,418 A | 3/1969 | Wagner | 55/25 |
| 3,431,195 A | 3/1969 | Storch et al. | 208/101 |
| 3,564,816 A | 2/1971 | Batta | 55/26 |
| 3,986,849 A | 10/1976 | Fuderer et al. | 55/25 |
| 4,547,205 A | 10/1985 | Steacy | 55/25 |
| 5,012,037 A | 4/1991 | Doshi et al. | 585/822 |
| 5,178,751 A | 1/1993 | Pappas | 208/340 |
| 5,250,088 A | 10/1993 | Yamaguchi et al. | 95/98 |
| 5,656,065 A * | 8/1997 | Kalbassi et al. | 95/105 |
| 6,007,606 A * | 12/1999 | Baksh et al. | 208/103 |
| 6,261,343 B1 * | 7/2001 | Golden et al. | 95/127 |

OTHER PUBLICATIONS

AIChE Journal, "Hydrogen Purification from Refinery Fuel Gas by Pressure . . . ", A. Malek, et al, vol. 44, 9/98.

* cited by examiner

*Primary Examiner*—Hien Tran
*Assistant Examiner*—Tam Nguyen
(74) *Attorney, Agent, or Firm*—Geoffrey L. Chase

(57) ABSTRACT

The present invention describes a pressure swing adsorption (PSA) apparatus and process for the production of purified hydrogen from a feed gas stream containing heavy hydrocarbons (i.e., hydrocarbons having at least six carbons). The apparatus comprises at least one bed containing at least three layers. The layered adsorption zone contains a feed end with a low surface area adsorbent (20 to 400 $m^2/g$) which comprises 2 to 20% of the total bed length followed by a layer of an intermediate surface area adsorbent (425 to 800 $m^2/g$) which comprises 25 to 40 % of the total bed length and a final layer of high surface area adsorbent (825 to 2000 $m^2/g$) which comprises 40 to 78% of the total bed length.

18 Claims, 2 Drawing Sheets

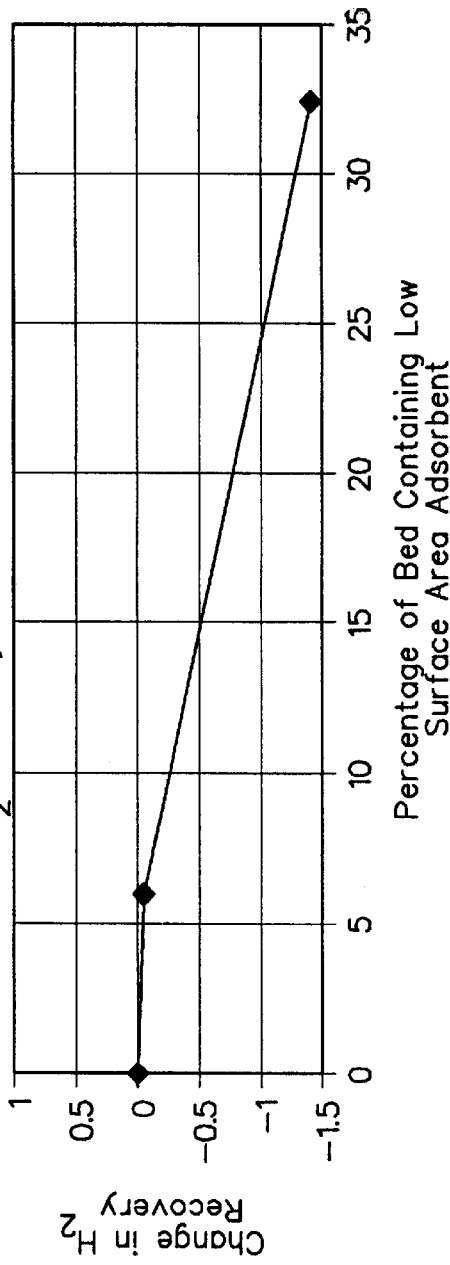
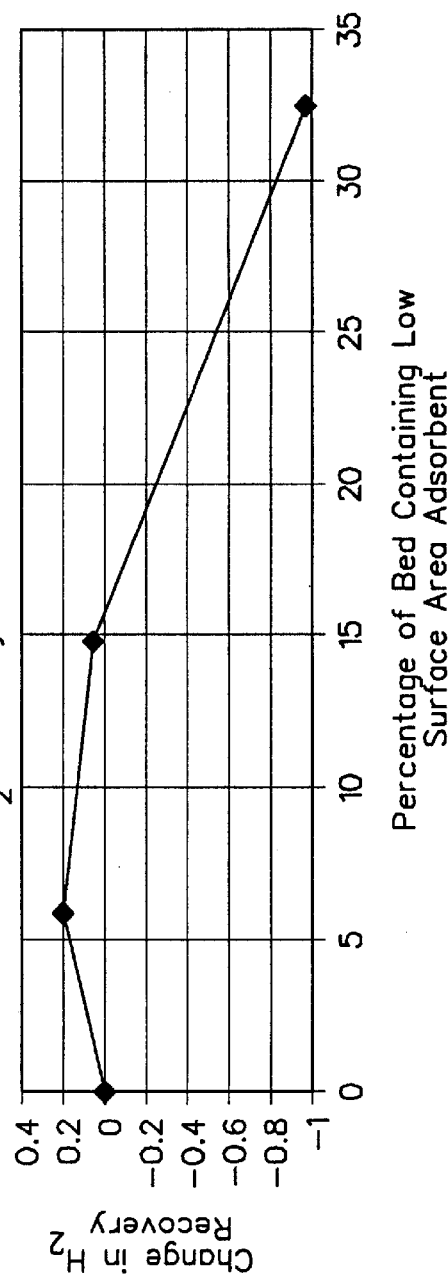

LAYERED ADSORPTION ZONE FOR HYDROGEN PRODUCTION SWING ADSORPTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to adsorption processes and more particularly to a pressure swing adsorption (PSA) for separating heavy hydrocarbons from mixtures comprising hydrogen and heavy hydrocarbons.

The need for hydrogen is increasing for petroleum refiners. The hydrogen is needed for both the reformulation of gasoline as well as for hydrosulfurization.

While refiners do have a supply of hydrogen typically from steam methane reformers, they also have hydrogen-rich cracked gas streams from various unit operations, including catalytic cracking and reforming. Typically, these streams are burned for their fuel value. The presence of hydrogen in the fuel increases $NO_x$ formation and the low BTU value of the fuel decreases crude unit production due to burner limitations. As refiners strive to squeeze more hydrogen out of their plants, they have turned their attention to these cracked gas streams. Subsequently, there is considerable interest in recovering essentially pure hydrogen from refinery cracked gas streams. Typical feed compositions are 20% methane, 10% ethane, 5% propane, 2% butane, 0.5% pentanes and higher with the remainder hydrogen. Thus, the desire in the industry is to develop an adsorption system capable of producing high purity hydrogen from hydrogen-rich cracked gas streams which contain heavy hydrocarbons.

The production and recovery of hydrogen by steam and/or air reforming of hydrocarbon rich gas streams such as natural gas, naphtha, or other mixtures of low molecular weight hydrocarbons is well known in the art. In PSA processes, a multicomponent gas is passed to at least one of a plurality of adsorption beds at an elevated pressure to adsorb at least one strongly adsorbed component while at least one component passes through. In the case of $H_2$PSA, hydrogen is the weakly adsorbed component which passes through the bed. At a defined time, the feed step is discontinued and the adsorption bed is depressurized in one or more concurrent steps which permit essentially pure $H_2$ product to exit the bed. Then a countercurrent desorption step is carried out, followed by countercurrent purge and repressurization. Such $H_2$PSA processing is disclosed by, e.g., U.S. Pat. Nos. 3,430,418 (Wagner), 3,564,816 (Batta) and 3,986,849 (Fuderer et al.).

The production of high purity hydrogen from cracked gas streams containing heavy hydrocarbons requires removal of the second most weakly adsorbing feed gas component, methane, from hydrogen, which is the most weakly adsorbed component.

The separation of methane from hydrogen requires a microporous adsorbent, like activated carbon or zeolites. The microporosity is required for good selectivity for methane over hydrogen. However, microporous adsorbents, like activated carbons, adsorb $C_4$-plus hydrocarbons very strongly which cannot be desorbed under typical PSA conditions.

A number of developments relate to PSA processes for removing methane from hydrogen-containing streams which have significant quantities of $C_{6+}$ (i.e., $C_n$ where $n \geq 6$) hydrocarbons. For example, U.S. Pat. No. 4,547,205 (Stacey), describes a process for the recovery of hydrogen and $C_{6+}$ hydrocarbons from a hydrocarbon conversion process. The separation is achieved by first partially condensing out the heavy hydrocarbons. The remaining vapor is then compressed and cooled to further condense out heavy hydrocarbons. The pressurized uncondensed compounds are then sent to a PSA for the production of pure hydrogen.

In U.S. Pat. No. 5,012,037 (Doshi et al.), an integrated thermal swing-pressure swing adsorption process for hydrogen and hydrocarbon recovery is disclosed. In this process, a thermal swing adsorption system is used to adsorb heavy hydrocarbons from the feed stream and a pressure swing adsorption system is used to remove the remaining light hydrocarbons to produce a pure hydrogen stream. Of particular interest in both the 4,547,205 and 5,012,037 patents is that $C_{6+}$ hydrocarbons are removed prior to PSA.

Other patents which disclose processes for the recovery of hydrogen and hydrocarbons from hydrocarbon conversion processes include U.S. Pat. Nos. 3,431,195 (Storch et al.) and 5,178,751 (Pappas). Both of these patents disclose processes in which refrigeration and partial condensation of heavy hydrocarbons is carried out prior to introduction to the PSA system.

U.S. Pat. No. 5,250,088 (Yamaguchi et al.) teaches the use of a layered bed PSA to produce pure hydrogen from a cracked gas stream. This invention teaches a two-layered bed (silica gel followed by activated carbon) approach to produce pure $H_2$, in which the heaviest feed gas component is $C_5H_{12}$. More recently, a two-layer bed approach very similar to that of the 5,250,088 patent has been published for a feed gas containing $C_4H_{10}$ (Malek, et al., AIChE Journal, Vol. 44, No. 9, 1985–1992 (1998)). In both these cases, the percentage of bed containing silica gel is about 25%.

Typically, integrated processes involving thermal swing adsorption (TSA) and/or refrigeration have been utilized to remove the hydrocarbons before introduction to the PSA system. Accordingly, in view of the above-described need to separate heavy hydrocarbons from a mixture comprising hydrogen and heavy hydrocarbons, it is desired to provide processes which avoid the need to utilize thermal swing adsorption and/or refrigeration prior to PSA to accomplish the desired separation.

BRIEF SUMMARY OF THE INVENTION

This invention provides an improved pressure swing adsorption (PSA) apparatus used to separate heavy hydrocarbons from mixtures comprising hydrogen and heavy hydrocarbons. The apparatus of the present invention comprises at least one bed containing at least three layers comprising a feed-end layer containing a feed-end adsorbent having a first surface area sufficiently small to separate a heavy hydrocarbon having at least six carbons from a light hydrocarbon having less than six carbons, wherein the first surface area is too small to substantially separate methane from hydrogen. The apparatus further comprises a product-end layer containing a product-end adsorbent having a second surface area sufficiently large to separate methane from hydrogen, and an intermediate layer containing an intermediate adsorbent having an intermediate surface area intermediate to said first surface area and said second surface area. The invention also provides an improved PSA process utilizing the PSA apparatus of the present invention.

BRIEF DESCRIPTION OF SEVERAL VIEWS OF THE DRAWINGS

The invention will be described in conjunction with the following drawings in which like reference numerals designate like elements and wherein:

FIGS. 1, 2 and 3 are graphs of change in $H_2$ recovery versus percentage of bed containing low surface area adsorbent.

DETAILED DESCRIPTION OF THE INVENTION

Figure 3:
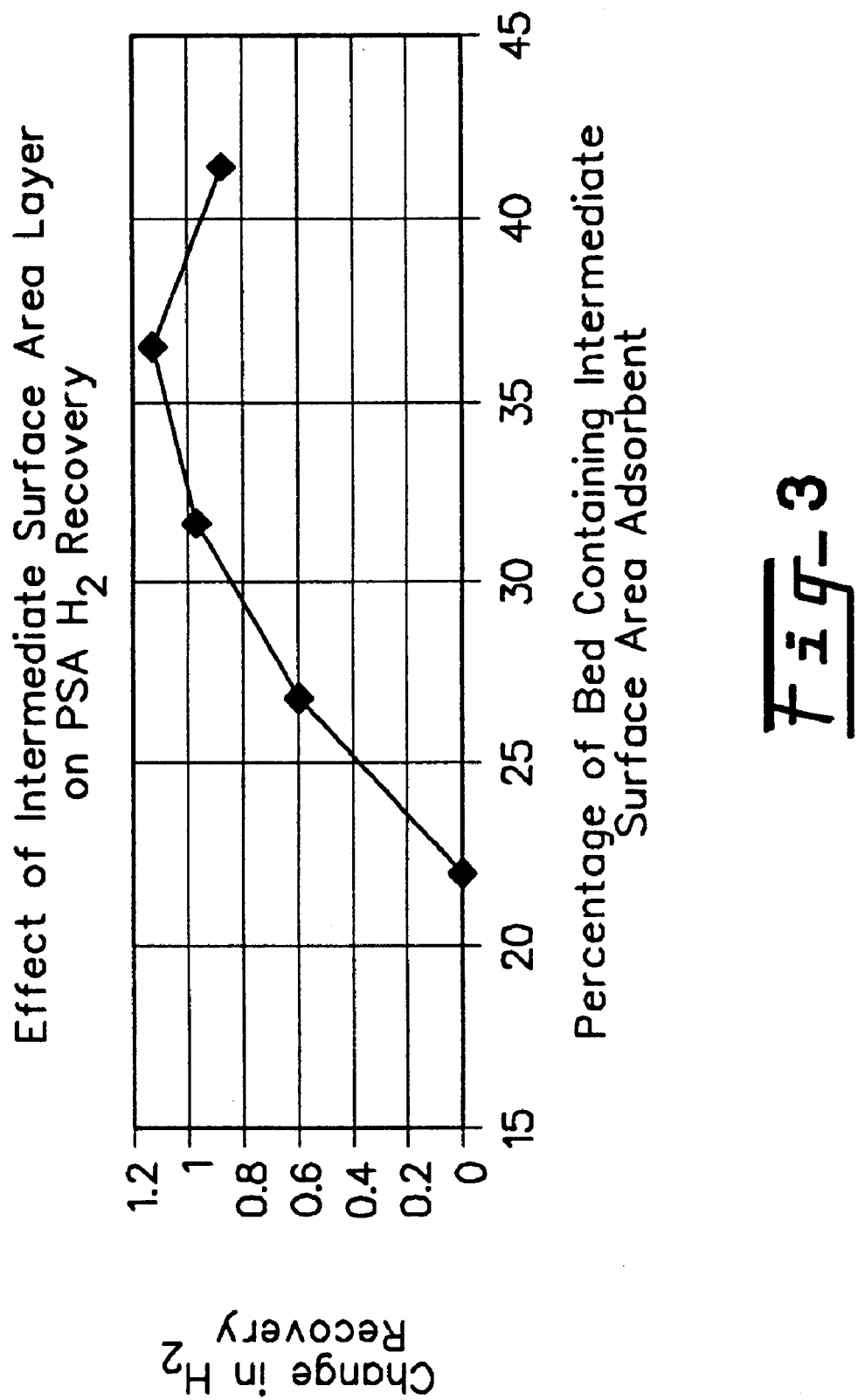

The current invention defines optimal adsorbent layering for the production of hydrogen from cracked gas streams containing at least six carbons ($C_{6+}$ hydrocarbons).

In preferred embodiments, a PSA apparatus is provided which comprises at least one bed containing at least three layers. The adsorbent layers include a feed-end layer, an intermediate layer and a product-end layer. The layers of the present invention are further defined by their 1) surface area and 2) percentage of total bed length.

The feed-end layer contains a feed-end adsorbent having a first surface area sufficiently small to separate a heavy hydrocarbon (i.e., a hydrocarbon having at least six carbons) from a light hydrocarbon (i.e., a hydrocarbon having less than six carbons), wherein the first surface area is too small to substantially separate methane from hydrogen. With respect to the feed-end layer, "substantially separate" means that the surface area is not large enough to produce high purity $H_2$ (less than 100 ppm $CH_4$) from a gaseous mixture containing methane and hydrogen. The feed end of the bed contains adsorbents with a low surface area from about 20 to about 400 m$^2$/g, which comprise about 2% to about 20% of the total bed length. The feed-end adsorbent has a particle size diameter of 0.5 to 3 mm. Preferred feed-end adsorbents are activated alumina, silica gel, titania, silica-alumina or zinc oxide.

The bed further comprises a product-end layer containing a product-end adsorbent having a second surface area sufficiently large to separate methane from hydrogen, and an intermediate layer containing an intermediate adsorbent having an intermediate surface area intermediate to said first surface area of the feed-end and said second surface area of the product-end layers. The intermediate layer contains an adsorbent with an intermediate surface area (from about 425 to about 800 m$^2$/g) and the product-end layer contains a high surface area adsorbent with a high surface area (from about 825 to about 2000 m$^2$/g). The intermediate layer adsorbent comprises about 25% to about 40% of the total bed length and the high surface area adsorbent of the product-end layer comprises about 40% to about 73% of the bed. The product end adsorbent has a particle size diameter of 1 to 3 mm. Preferred intermediate adsorbents are silica gel or activated carbon, and the preferred product-end adsorbents are activated carbon or zeolite. The intermediate layer adsorbent has a particle size diameter of 1 to 3 mm. This adsorbent layering allows the introduction of $C_{6+}$ hydrocarbons into the PSA without the need for other pretreatment processes such as TSA or refrigeration.

In another aspect of the invention, a PSA process is employed to provide purified hydrogen mixtures. The process of the invention employs a PSA apparatus of the invention. The PSA process comprises a high pressure adsorption step comprising introducing a feed gas mixture containing hydrogen and heavy hydrocarbons having at least six carbons into the feed-end of the adsorbent bed at a high adsorption pressure. The less readily adsorbable component(s) passes through the bed and is discharged from the product end where a product gas containing at least 95% hydrogen is recovered.

The process is effective for separating hydrogen from gas mixtures containing heavy hydrocarbons and methane. For example, in certain embodiments, a feed gas mixture containing from about 30% to about 95% hydrogen, and from about 0.005% to about 2% of heavy hydrocarbons can be processed to provide a product gas containing less than 1 ppm of said heavy hydrocarbons and at least 99% hydrogen. A feed gas mixture containing at least 2% methane can yield a product gas containing less than 100 ppm of methane.

In the adsorption zone, the more readily adsorbable components are adsorbed at an adsorption pressure and temperature and the less readily adsorbable components are passed through the adsorption zone. Preferred adsorption zone pressures range from about 150 to about 500 psig. The adsorption zone temperature is any temperature effective to adsorb the more readily adsorbable components in the feedstream, and preferably from about 0° C. to about 50° C. (about 32° F. to about 122° F.).

The invention will be illustrated in more detail with reference to the following Examples, but it should be understood that the present invention is not deemed to be limited thereto.

EXAMPLE 1 COMPARATIVE EXAMPLE

The feed gas composition for a PSA simulation was 58.4% $H_2$, 16.8% $CH_4$, 12.9% $C_2H_6$, 8.4% $C_3H_8$, 2.6% $C_4H_{10}$, 0.6% $N_2$ and 0.3% $C_5H_{12}$. The feed pressure was 250 psig at 77° F. (25° C.). A four-bed PSA cycle with two pressure equalizations was simulated. The total bed length of 20.3 feet was filled with (starting from the feed end of the bed) a low surface area adsorbent (activated alumina, 320 m$^2$/g), followed by an intermediate surface area adsorbent (silica gel, 750 m$^2$/g) and a high surface area adsorbent (activated carbon, 1200 m$^2$/g). The simulation was used to determine the optimal amount of low surface area adsorbent while keeping the high surface area adsorbent amount constant. Thus, the simulation evaluated the effect of increasing the amount of low surface area adsorbent at the expense of the intermediate surface area adsorbent. The final $H_2$ product contained 6000 ppm $N_2$ and 20 ppm $CH_4$.

FIG. 1 shows the effect of the addition of a low surface area layer, i.e. activated alumina, in the PSA bed on the hydrogen recovery. The base bed loading was 6.6 feet (32.5% of the bed) of silica gel and 13.7 feet (67.5% of the bed) activated carbon. Introduction of 1.2 feet (5.9% of the bed) of activated alumina, while keeping the amount of activated carbon the same, reduced the hydrogen recovery by 0.05 percentage points. Increasing the alumina section to 6.6 feet (32.5% of the bed) and removing all the silica gel reduced the hydrogen recovery 1.4 percentage points. The results from FIG. 1 show that if the heaviest hydrocarbon present in the feed stream is $C_5H_{12}$, then a low surface area layer is not needed to optimize the performance of the PSA.

EXAMPLE 2

Another PSA simulation was performed to determine the performance (hydrogen recovery) of a PSA system for the production of hydrogen and to evaluate the effect of increasing the amount of low surface area adsorbent at the expense of the intermediate surface area adsorbent. The feed gas composition in this example was 55.9% $H_2$, 16.8% $CH_4$, 12.9% $C_2H_6$, 8.4% $C_3H_8$, 2.6% $C_4H_{10}$, 0.6% $N_2$, 2.3%

$C_5H_{12}$ and 0.5% $C_6H_{14}$. The feed pressure was 250 psig at 77° F. (25° C.). As in the example above, a four-bed PSA cycle with two pressure equalizations was simulated. The total bed length of 20.3 feet was filled with a low surface area adsorbent (activated alumina, 320 m²/g), followed by an intermediate surface area adsorbent (silica gel, 750 m²/g) and a high surface area adsorbent (activated carbon, 1200 m²/g). The final $H_2$ product contained 6000 ppm $N_2$ and 20 ppm $CH_4$.

FIG. 2 shows the effect of the addition of alumina to the PSA bed on the hydrogen recovery. As a result, the addition of 1.2 feet of alumina (5.9% of bed) increased the hydrogen recovery by 0.2 percentage points. Increasing the layer of alumina to 3.0 feet (14.8% of bed) improved the $H_2$ recovery slightly. As the amount of alumina was increased to 6.6 feet (32.5% of the bed), the hydrogen recovery decreased about 1.0 percentage point versus a case where no alumina is present. These results indicate that if $C_6H_{12}$ is present in the feed stream, then the addition of a low surface area adsorbent layer at the feed end of the PSA bed improves the PSA performance. The percentage of the total bed length which contains the low surface area adsorbent should range from 2 to 20% of the total bed length for optimal performance.

EXAMPLE 3

A computer simulation was performed to determine the optimal percentage of bed length for the intermediate surface area layer using the feed and process conditions as in Example 2. In this simulation, the percentage of the bed containing low surface area adsorbent was held constant as the amount of intermediate and high surface area adsorbents were varied. The results of the simulation are given in FIG. 3. As the percentage of bed containing intermediate surface area adsorbent (silica gel) increases from 22% of the total bed, the $H_2$ recovery increases and reaches a maximum at 36% of the total bed length. As the amount of the intermediate surface area increases beyond 36% of the total bed length, the $H_2$ recovery starts to decrease. The optimal bed loading of intermediate surface area layer is from 25 to 40% of the total bed length. The high surface area layer should therefore constitute from 40 to 73% of the total bed length.

EXAMPLE 4

A final computer simulation was performed by to determine the effect of the particle size of the low surface area adsorbent on PSA recovery. Using the same feed and process conditions as in Examples 2–3, a bed of 5.9% activated alumina, 26.6% silica gel and 67.5% activated carbon was simulated with varying particle size of the activated alumina. When the activated alumina particle diameter was reduced from 1.8 mm to 1.0 mm, the $H_2$ recovery increased 0.1 percentage points. This result shows that a smaller particle adsorbent on the feed end of the bed can improve the overall performance of the PSA system.

The approach of the current invention is to allow heavy hydrocarbons into the PSA. This can be accomplished by using low surface area, large pore adsorbents at the feed end of the PSA bed which effectively desorb the heavy hydrocarbons in the process. Since the low surface area adsorbents do not have the $CH_4$ capacity or selectivity needed to produce high purity hydrogen, the present invention also utilizes a three layer bed to produce pure $H_2$ in which the heaviest feed gas component comprises $C_6$ and greater hydrocarbons.

While the invention has been described in detail and with reference to specific examples thereof, it will be apparent to one skilled in the art that various changes and modifications can be made therein without departing from the spirit and scope thereof.

What is claimed is:

1. A process for providing purified hydrogen comprising feeding into a feed end of a pressure swing adsorption apparatus a feed gas mixture containing hydrogen, methane, and heavy hydrocarbons having at least six carbons; and
    recovering from a product end of said apparatus a product gas containing at least 95% hydrogen, wherein said apparatus comprising at least one bed containing at least three layers;
    a feed-end layer containing a feed-end adsorbent having a first surface area sufficiently small to separate a heavy hydrocarbon having at least six carbons from a light hydrocarbon having less than six carbons, wherein said first surface area is too small to substantially separate methane from hydrogen;
    a product-end layer containing a product-end adsorbent having a second surface area sufficiently large to separate methane from hydrogen; and
    an intermediate layer containing an intermediate adsorbent having an intermediate surface area intermediate to said first surface area and said second surface area.

2. The process of claim 1, wherein said feed gas mixture contains 30 to 95% hydrogen and about 0.005 to about 2% of said heavy hydrocarbons, and said product gas contains less than 1 ppm of said heavy hydrocarbons.

3. The process of claim 2, wherein said product gas contains at least 99% hydrogen.

4. The process of claim 2, wherein said feed gas mixture further contains at least 2% methane and said product gas contains less than 100 ppm of methane.

5. The process of claim 1, wherein said feed gas is fed into said feed end of said apparatus at a temperature of 0 to 50° C.

6. The process of claim 1, wherein said feed gas is fed into said feed end of said apparatus at a pressure of 150 to 500 psig.

7. The process of claim 6, wherein said feed gas is fed into said feed end of said apparatus at a temperature of 0 to 50° C.

8. The process of claim 1, wherein said first surface area is from about 20 m²/g to about 400 m²/g.

9. The process of claim 1, wherein said intermediate surface area is from about 425 m²/g to about 800 m²/g.

10. The process of claim 1, wherein said second surface area is from about 825 m²/g to about 2000 m²/g.

11. The process of claim 1, wherein said first surface area is from 20 m²/g to 400 m²/g, said intermediate surface area is from 425 m²/g to 800 m²/g, and said second surface area is from 825 m²/g to 2000 m²/g.

12. The process of claim 1, wherein said feed-end adsorbent occupies about 2% to about 20% of a total length of said at least one bed.

13. The process of claim 1, wherein said intermediate adsorbent occupies about 25% to about 40% of a total length of said at least one bed.

14. The process of claim 1, wherein said product-end adsorbent occupies about 40% to about 73% of a total length of said at least one bed.

15. The process of claim 1, wherein said feed-end adsorbent occupies 2% to 20% of a total length of said at least on bed, said intermediate adsorbent occupies 25% to 40% of said total length, and said product-end adsorbent occupies 40% to 73% of said total length.

16. The process of claim 15, wherein said first surface area is from 20 m$^2$/g to 400 m$^2$/g, said intermediate surface area is from 425 m$^2$/g to 800 m$^2$/g, and said second surface area is from 825 m$^2$/g to 200 m$^2$/g.

17. The process of claim 16, wherein said feed-end adsorbent is activated alumina silica gel, titania, silica-alumina or zinc oxide, said intermediate adsorbent is silica gel or activated carbon, and said product-end adsorbent is activated carbon or zeolite.

18. The process of claim 17, wherein said feed-end adsorbent has a particle size diameter of 0.5 to 3 mm, said intermediate adsorbent has a particle size diameter of 1 to 3 mm, and said product-end adsorbent has a particle size diameter of 1 to 3 mm.

* * * * *

UNITED STATES PATENT AND TRADEMARK OFFICE
CERTIFICATE OF CORRECTION

PATENT NO.   : 6,483,001 B2                                                                  Page 1 of 1
DATED        : November 19, 2002
INVENTOR(S)  : Timothy Christopher Golden et al.

It is certified that error appears in the above-identified patent and that said Letters Patent is hereby corrected as shown below:

Column 6,
Line 64, cancel "on" and insert -- one—bed --,

Column 7,
Line 4, cancel "200" and insert -- 2000—$m^2$/g --.

Signed and Sealed this

Eighth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,483,001 B2
DATED          : November 19, 2002
INVENTOR(S)    : Timothy Christopher Golden et al.

It is certified that error appears in the above-identified patent and that said Letters Patent is hereby corrected as shown below:

Column 6,
Line 64, cancel "on" and insert -- one -- bed,

Column 7,
Line 4, cancel "200" and insert -- 2000 -- $m^2/g$.

Signed and Sealed this

Twenty-fourth Day of June, 2003

JAMES E. ROGAN
*Director of the United States Patent and Trademark Office*